United States Patent [19]

Libin

[11] Patent Number: 4,694,864

[45] Date of Patent: Sep. 22, 1987

[54] DOUBLE-WALL TUBE FOR A HEAT EXCHANGER

[75] Inventor: Bernard Libin, Marly Le Roi, France

[73] Assignee: Novatome, Le Plessis Robinson, France

[21] Appl. No.: 728,420

[22] Filed: Apr. 29, 1985

[30] Foreign Application Priority Data

May 4, 1984 [FR] France .................. 84 06940

[51] Int. Cl.⁴ .............................................. F16L 9/18
[52] U.S. Cl. .................... 138/113; 29/455 R; 228/132
[58] Field of Search ............ 138/111–114, 138/104, 148, 142; 29/455 R, 455 LM, 457; 165/70, 133, 154, 156; 228/132

[56] References Cited

U.S. PATENT DOCUMENTS

| 3,235,947 | 2/1966 | Sohlemann | 29/455 R |
| 3,299,417 | 1/1967 | Sibthorpe | 29/455 R |
| 3,977,439 | 8/1976 | Lambert | 138/114 |
| 4,285,396 | 8/1981 | Schwoerer et al. | 138/114 |

FOREIGN PATENT DOCUMENTS 2915838 10/1980 Fed. Rep. of Germany ...... 138/113

0703081 1/1954 United Kingdom .
0804592 11/1958 United Kingdom .
0822705 10/1959 United Kingdom .

OTHER PUBLICATIONS

Howard H. Manko, "Solders and Soldering", Second Edition, McGraw-Hill Pub., at pp. 92–93.

Primary Examiner—Stephen Marcus
Assistant Examiner—L. J. Peters
Attorney, Agent, or Firm—Pollock, Vande Sande & Priddy

[57] ABSTRACT

A double-wall tube for a heat exchanger and method for producing same, the tube being formed by two tubular walls (1, 2) mounted one inside the other with a very small clearance (3) and then made to have a tight fit therebetween, the outer surface of the inner wall (2) and the inner surface of the outer wall (1) being interconnected by a thin layer of brazing metal in regions (4) which are discontinuous both in the circumferential direction and in the longitudinal direction of the tube. The brazed regions (4) represent 5 to 15% of the confronting surfaces of the inner wall (2) and outer wall (1) of the tube. The invention is in particular applicable to steam generators of fast neutron nuclear reactors.

8 Claims, 5 Drawing Figures

DOUBLE-WALL TUBE FOR A HEAT EXCHANGER

FIELD OF THE INVENTION

The invention relates to a double-wall tube for a heat exchanger for two fluids, constituted by two coaxial tubular walls disposed one inside the other substantially without clearance, and a method for producing this tube.

BACKGROUND

Heat exchangers for two fluids are known whch comprise double-wall tubes, the inner wall having a smaller diameter being adapted to come into contact with one of the fluids by its inner surfce and the outer wall having a larger diameter being adapted to come into contact with the other fluid by its outer surface.

Although the two walls are mounted one inside the other with a very small mechanical clearance, a gas can nonetheless travel in most cases between these two walls so that, in the event of a perforation of one of the two walls, the fluid in contact with the perforated wall may spread and travel in the space between the two walls. It is thus possible to detect possible leakages by the perforation of one or the other of the walls by connecting the space of very small size between the walls to a detecting chamber.

The double wall therefore improves the safety of the exchanger since a double barrier is interposed between the two fluids and a leakage through one of the walls may be detected before the integrity of the other is affected.

Such double-wall tubes are employed, for example, in the case of steam generators of fast neutron nuclear reactors, the exchange fluids of which are liquid sodium and water which is vaporized by means of the heat conveyed by the liquid sodium. The liquid sodium at high temperature (500° C. or more)comes into contact with the outer surface of the outer wall of the tube. The water and the steam under very high pressure and at a temperature in the neighborhood of that of the liquid sodium flow inside the tube in contact with the inner surface of the inner wall.

In this application to steam generators of fast neutron reactors, the fact use of double-wall tubes increases the cost of construction of the apparatus, but safety is increased in considerable proportions.

The use of steam generators having double-wall tubes even permits the elimination of the secondary circuit of nuclear reactors to be envisaged, since the heating of the water and its conversion into steam may be achieved directly by the heat conveyed by the primary sodium. Indeed, the probability of the occurrence of a leakage becomes very small and the detection of a possible leakage is achieved in a reliable and very rapid manner in a steam generator having double-wall tubes. The probability of a leakage occuring and developing and resulting in a notable mixture of primary sodium and water or steam is therefore very small and practically nil.

The double-wall tubes for a heat exchanger may be made by different methods which impart thereto different thermal or mechanical characteristics.

A first method consists in passing the tubular walls one inside the other and then creating a tight fit therebetween by a mechanical pre-stressing, for example by a co-drawing thereof. In such tubes, the actual area of contact between the two walls represents only approximately 5% of the total area of the confronting surfaces of the two walls. The thermal transfer through the two walls is thus substantially reduced by the existence of the interface and is liable to decrease over time by a releasing of the pressure of contact. Further, there occur differential expansions of the walls, longitudinal sliding between the two walls and therefore wear of their interface. On the other hand, in the case of a perforation of one of the two walls, the fluid passing through the perforated or pierced wall and entering the interstice between the two walls can travel therein either throughout the length of the tube, or reach grooves machined in one of the contacting surfaces and thus reach the ends of the tube connected to a detection chamber. Indeed, although the interstice between the two tubes has a very small width, the fluid is stopped by no barrier since the actual surfaces of contact of the two walls have a small extent.

A second method consists in metallurgically interconnecting the confronting surfaces of the two walls, for example by brazing, the brazing metal covering the whole of the surfaces in contact of the two walls. In this way, there is a considerable improvememt in the thermal transfer, deterioration thereof over a period of time is avoided and longitudinal relative sliding of the walls of the tube when it expands is avoided. On the other hand, the detection of the leakages can theoretically only occur through grooves machined in one of the surfaces in contact of the two walls, and in the event of any leakage issuing from a perforation located between the grooves, it is highly probable that it will not reach them or reach them only after a very long period of time. Further, it is difficult to ensure that these grooves provide continuous passageways for the fluid after brazing.

SUMMARY OF THE INVENTION

An object of the invention is therefore to provide a double-wall tube for a heat exchanger having two fluids, formed by two coaxial tubular walls which are mounted one inside the other and then made to fit closely together, the inner wall having the smaller diameter being adapted to come into contact with one of the fluids by its inner surface and the outer wall having the larger diameter being adapted to come into contact with the other fluid by its outer surface, this tube permitting the obtainment of a sufficient thermal transfer, which does not deteriorate over time, between the two fluids, a reliable detection of possible leakages in a wall of the tube, and a strong assembly of the two walls so as to avoid any sliding when the tube expands.

For this purpose, the outer surface of the inner tube and the inner surface of the outer tube are interconnected by a thin layer of brazing metal in discontinuous regions both in the circumferential direction and in the longitudinal direction of the tube, representing together between 5 and 15% of the confronting surfaces of the inner and outer walls of the tube.

BRIEF DESCRIPTION OF THE DRAWINGS

In order to explain the invention, there will now be described by way of a non-limiting example with reference to the accompanying drawings, several embodiments of a double-wall tube according to the invention.

DETAILED DESCRIPTION

Figure 1:
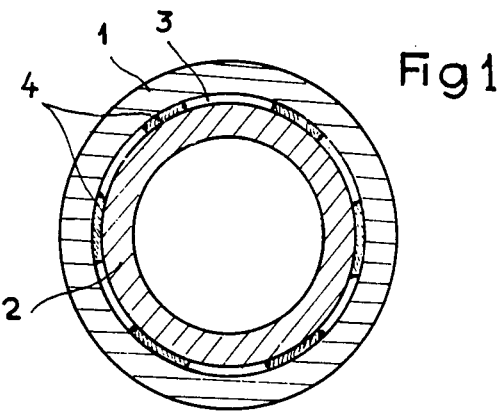
FIG. 1 is a sectional view in a plane perpendicular to the axis of a double-wall tube according to the invention.

FIG. 1 shows a double-wall tube comprising an outer wall 1 and an inner wall 2 mounted one inside the other with a very small annular clearance 3. A part of the space 3, and only a part thereof, is occupied by brazed regions 4 which are discontinuous along the circumference of the double-wall tube. These brazed regions 4 ensure the junction of the tubes 1 and 2 without eliminating the annular space 3 of very small width. The width of the space 3 and of the brazed regions 4 is on the order of 10 to 30 microns.

Reference will now be made to FIGS. 1 and 2a, 2b and 2c for describing the method for obtaining a double-wall tube according to a first embodiment of the invention.

Figure 2C:
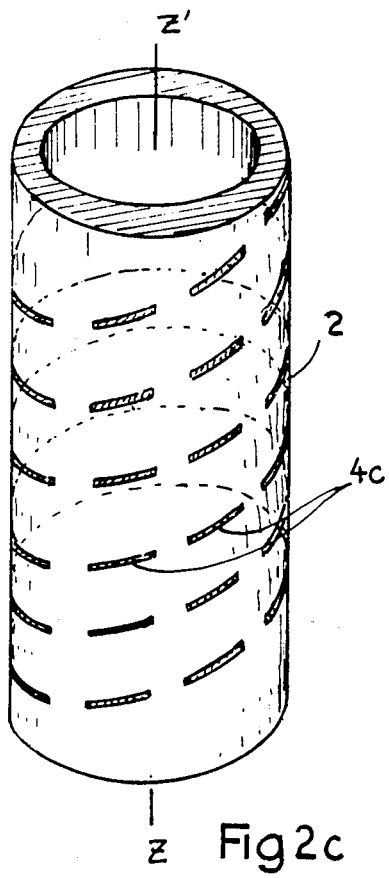
FIGS. 2a, 2b, and 2c are perspective views of the inner wall of a double-wall tube according to the invention.
Figure 2B:
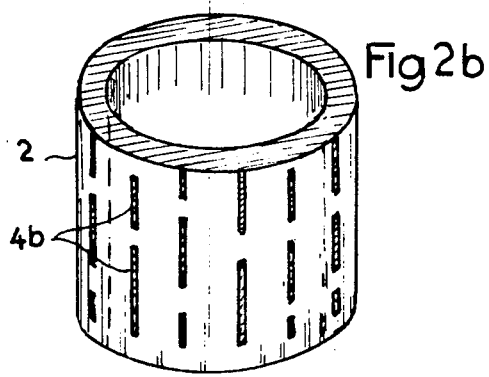
Figure 2A:
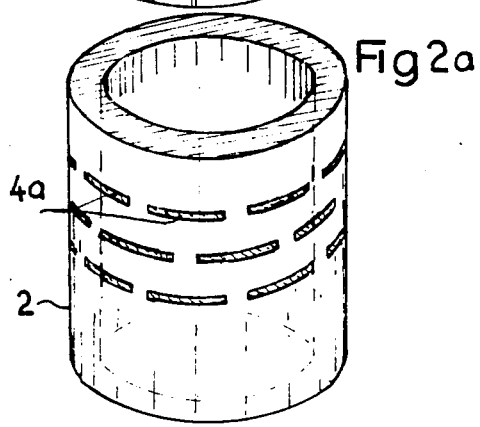

Shown in FIGS. 2a, 2b and 2c is the inner wall 2 of a double-wall tube such as that shown in FIG. 1, on which have been deposited very thin bands of a brazing material permitting a junction of the two walls of the tube.

In FIG. 2a, the brazed regions 4a have the shape of discontinuous annular segments disposed in alignment throughout the periphery of the inner wall 2. In the longitudinal direction of the tube, the brazed regions 4a are disposed along successive annular regions in which the segments 4a are slightly staggered in the circumferential direction of the tube.

In FIG. 2b, the brazing regions 4b are disposed in alignment with each other along portions of a generatrix with gaps between two successive regions 4b, the generatrices along which the brazing bands are disposed being spaced apart a substantially constant circumferential distance on the surface of the wall 2.

The regions 4c brazed on the inner wall 2 shown in FIG. 2c are disposed along portions of one or more helices having for axis the axis Z—Z' of the tube.

In the construction of double-wall tubes of a fast neutron nuclear reactor steam generator whose outside diameter is 16 mm and whose inside diameter is 10 mm, there are employed for forming the two walls tubes of austenitic or ferritic stainless steel tubes or nickel alloy tubes whose outside diameters are in the neighborhood of 16 mm and 12 mm respectively, and whose thicknesses are in the neighborhood of 1 to 2 mm.

The outer tube is so calibrated that its outside diameter is very slightly greater than 16 mm and its inside diameter slightly greater than 12 mm. In the same way, the outside and inside diameters of the tube 2 constituting the inner wall are also a little greater than 12 and 10 mm, respectively. There are provided on the entire length of the tube 2 deposits of brazing in an arrangement such as that shown in FIG. 2a, in FIG. 2b or in FIG. 2c. These deposits of brazing have a thickness of 10 to 30 microns, a width of 1 to 2 mm and the different successive bands, which are either annular (FIG. 2a) or extend along generatrices (FIG. 2b), or extend along successive helices (FIG. 2c), are spaced 20 to 40 mm apart.

This spacing (or pitch) of the deposits of brazing will be determined in accordance with the width of the band of brazing so as to satisfy the relationship :

$$\text{width of band/pitch} = 0.05 \text{ to } 0.15$$

The inner surface of the outer wall 1 may itself be provided with a very thin continuous layer of brazing.

The brazing alloy is chosen in accordance with the grades of metal from which the two walls of the tube are made.

When the inner wall 2 has been covered with discontinuous bands of brazing as shown in one of the FIGS. 2a, 2b and 2c, this wall 2 is inserted into the outer wall 1 and mounted in the latter throughout its length.

The clearances initially provided enable this operation to be carried out without difficulty, notwithstanding the deposits of brazing on the inner wall.

The assembly of the two tubes 1 and 2 mounted one on the other is then re-drawn and then brought to a temperature on the order of 1000° C. so as to achieve the metallurgical junction between the two walls along their confronting surfaces covered with brazing.

The product obtained is such as that shown in FIG. 1. This double-wall tube has the advantage of having two walls which are perfectly fixed to each other longitudinally by brazing so that the two walls cannot move relative to each other when the tube expands in service.

Further, the region of contact between the two walls always has an area exceeding 5% of the area of the confronting walls, it being possible for this surface of contact to be up to 15% of the total area. However, the annular space 3 between the two walls of the tube remains continuous throughout the length of this tube, the bands of brazing 4 being discontinuous both in the circumferential direction and the longitudinal direction of the tube. In this way, in the event of a leakage in one of the walls, the fluid in contact with this wall can reach the interstice 3 and very easily travel to the ends of the tube where the latter may be connected to leakage detection chambers.

The two walls are maintained on each other both mechanically by the tight fit produced by the re-drawing of the tubes, an metallurgically by the bands of brazing. At the moment of the re-drawing of the tubes, the inner surface of the outer wall of the tube comes into contact with the bands of brazing deposited on the outer surface of the inner tube so that, during the heating due to the drawing of the tubes, a metallurgical junction is produced in the regions corresponding to the deposits of brazing.

The double-wall tubes may be made by a second method, as follows.

The inner and outer walls are formed by tubes whose materials and dimensions are identical to those given hereinbefore.

There are disposed on the outer surface of the inner wall 2 discontinuous masks in accordance with an arrangement similar to the arrangement of the regions of brazing 4a, 4b or 4c shown in FIGS. 2a, 2b and 2c respectively.

The outer surface of the inner wall 2 is then subjected to a chemical or electromechanical oxidation treatment which produces the deposit of a layer of oxide on the whole of the outer surface of the wall 2, except in the regions covered by the masks. The masks are then removed and the outer surface of the outer wall 1 is covered with a layer of continuous brazing of a thickness of 10 to 30 microns. The tubes 1 and 2 are then mounted one inside the other, co-drawn and heated to 1000° C. The brazed connection between the two tubes is only produced in the non-oxidized regions, i.e., in the regions corresponding to the bands 4a, 4b or 4c. The double-wall tube obtained has characteristics which are substantially identical to the tube obtained by the method consisting in depositing bands of brazing on the outer surface of the inner tube.

A third method may also be employed for producing a double-wall tube according to the invention. This method will be described with reference to FIG. 3.

It can be seen that the inner wall 10 has been machined in such manner that its roughness is relatively great. The asperities 12 of the outer surface of this wall 10 have a mean radial dimension on the order of 30 microns.

There is deposited on the inner surface of the outer tube 11 a layer 13 of a brazing alloy which has a thickness less than the mean roughness. The two tubes are then placed one inside the other, co-drawn and then maintained for a period of time at sufficient temperature to ensure their metallurgical connection, for example at a temperature of 1000° C. as before. It can be seen in FIG. 3 that the result of these operations is a double-wall tube whose junction regions are formed by the upper parts of the asperities 12.

The whole of the surface of these regions of contact of the asperities with the inner surface of the tube 11 covered with the layer of brazing represents 5 to 15% of the total confronting surface of the two walls 10 and 11.

Figure 3:
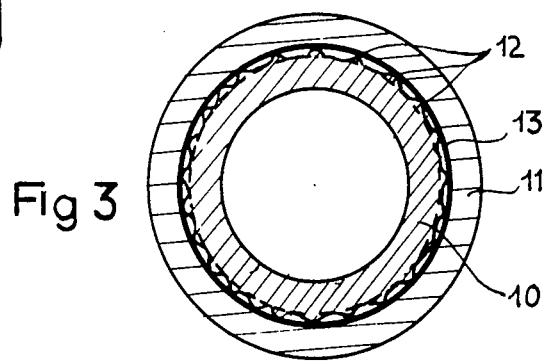
FIG. 3 is a sectional view in a plane perpendicular to the axis of the double-wall tube according to a modification of the invention.

The double-wall tube shown in FIG. 3 has the same advantages as the tube shown in FIG. 1, namely a metallurgical connection between the two walls preventing the relative sliding of these two walls in the longitudinal direction, a sufficient thermal exchange capacity and a continuous space for the circulation of leakage gas between the two walls.

It can be seen that the tubes according to the invention combine the advantages of double-wall tubes which simply have a tight fit and double-wall tubes which are a tight fit and have welded or soldered throughout their surface.

The scope of the invention is not intended to be limited to the embodiments which have just been described, but encompasses all modifications.

Thus, the regions of brazing metal interposed between the two walls of the tube may have a shape and an arrangement which are different from those described.

There may also be imagined other methods for producing the assembly of the two walls by means of discontinuous regions of brazing. This brazed region of the interface of the two walls must however represent at the minimum 5% and at the maximum 15% of the total area of the interface.

The thickness of the brazing metal between the two walls which corresponds to the maximum dimension of the interstice must also be between 10 and 30 microns.

The double-wall tubes according to the invention may be used in any type of heat exchanger employing two fluids.

What is claimed is:

1. A double-wall tube for a heat exchanger having two fluids, the tube comprising an inner tubular wall and outer tubular wall, the inner wall being disposed coaxially inside the outer wall with a very small clearance therebetween, with a subsequent tight fit therebetween, the inner wall having a smaller diameter being adapted to come into contact with one of said fluids by an inner surface and the outer wall having a larger diameter being adapted to come into contact with the other fluid by an outer surface, and a layer of brazing metal having a thickness between 10 and 30 microns interconnecting the outer surface of the inner wall and the inner surface of the outer wall in regions which are discontinuous both in a circumferential direction and in a longitudinal direction of the tube and together represent between 5 and 15% of confronting surfaces of the inner and outer walls of the tube.

2. A double-wall tube according to claim 1, wherein the regions of connection by the layer of brazing metal between the inner and outer walls have a shape of annular sectors separated by gaps and disposed in a plurality of successive ring arrangements in a longitudinal direction of the tube, the gaps in each of the ring arrangements being in staggered relation relative to the gaps of neighbouring ring arrangements.

3. A double-wall tube according to claim 1, wherein the regions of connection by the layer of brazing metal between the inner and outer walls are constituted by discontinuous bands disposed along generatrices of contacting surfaces of the inner and outer walls of the tube and separated by gaps, the generatrices along which the regions of connection are disposed being arranged in a substantially equidistant manner on the surface of connection between the walls.

4. A double-wall tube according to claim 1, wherein the regions of connection by the layer of brazing metal between the inner and outer walls are constituted by helical portions having for axis an axis of the tube, gaps being provided between the regions of connection in the form of helical portions.

5. A double-wall tube according to claim 1, wherein the inner wall has asperities having a mean radial dimension on the order of 30 microns and the outer wall is covered by a layer of brazing metal, discontinuous regions of connection between the inner and outer walls being constituted by peaks of said asperities on the inner wall having a high degree of roughness.

6. A double-wall tube according to claim 1, wherein said inner tubular wall is constituted by a first tubular wall having a deposit of a brazing metal on its outer surface, said first tubular wall being mounted throughout its length inside a second tubular wall constituting said outer tubular wall, said first and second tubular walls being subjected to a co-drawing and to a temperature sufficient to ensure their metallurgical connection by means of said brazing metal.

7. A double-wall tube according to claim 1, wherein said inner tubular wall is constituted by a first tubular wall having an oxidized outer surface with masks disposed in discontinuous regions, said oxidized tubular wall being mounted inside a second tubular wall constituting the outer tubular wall and having an inner surface covered with a continuous layer of brazing metal, said first and second tubular walls then being subjected to a co-drawing and to a temperature sufficient to ensure their metallurgical connection by means of said brazing 8. A double-wall tube according to claim 1, wherein said inner tube wall is constituted by a first tubular wall having an outer surface machined to a high mean roughness of the order of 30 micrometers, said first tubular wall being mounted inside a second tubular wall constituting the outer tubular wall and having an inner surface covered with a continuous layer of brazing metal, said first and second tubular walls then being subjected to a co-drawing and to temperature sufficient to ensure their metallurgical connection by means of said brazing metal.

* * * * *